Figure 8:
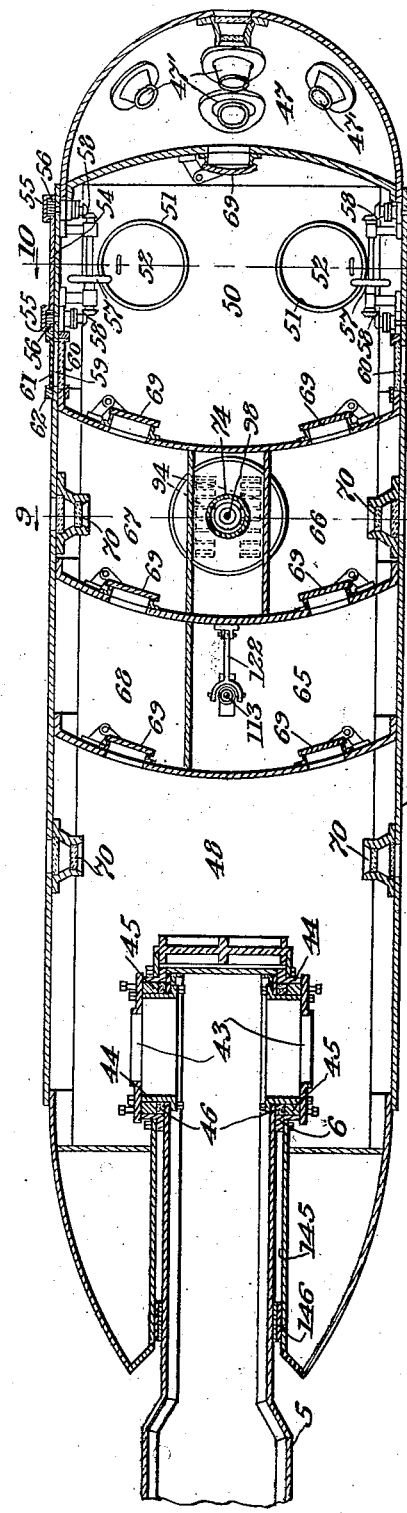

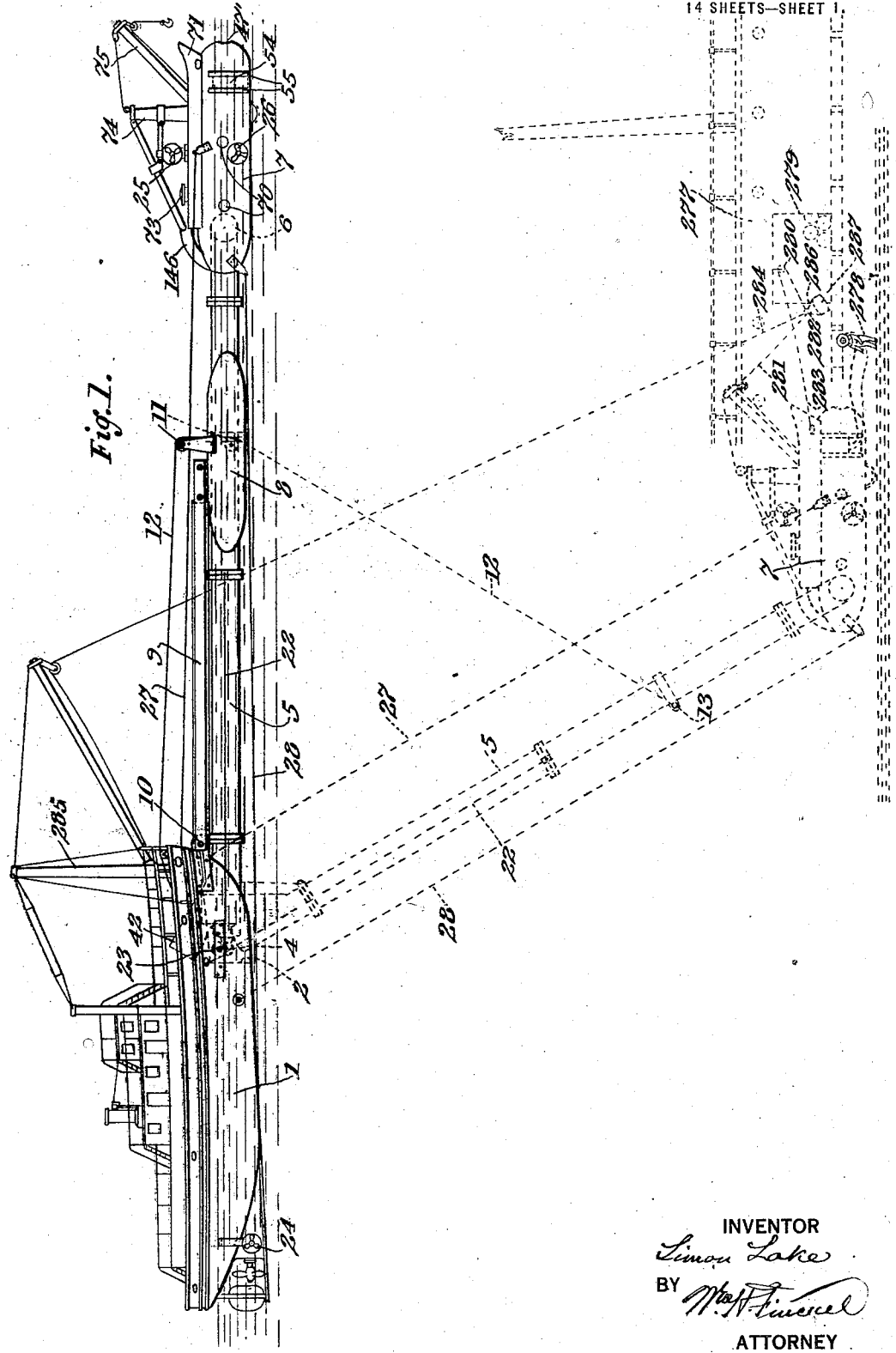

S. LAKE.
SUBMARINE SALVAGING AND EXPLORING APPARATUS.
APPLICATION FILED FEB. 7, 1920.
1,379,928.
Patented May 31, 1921.
14 SHEETS—SHEET 2.
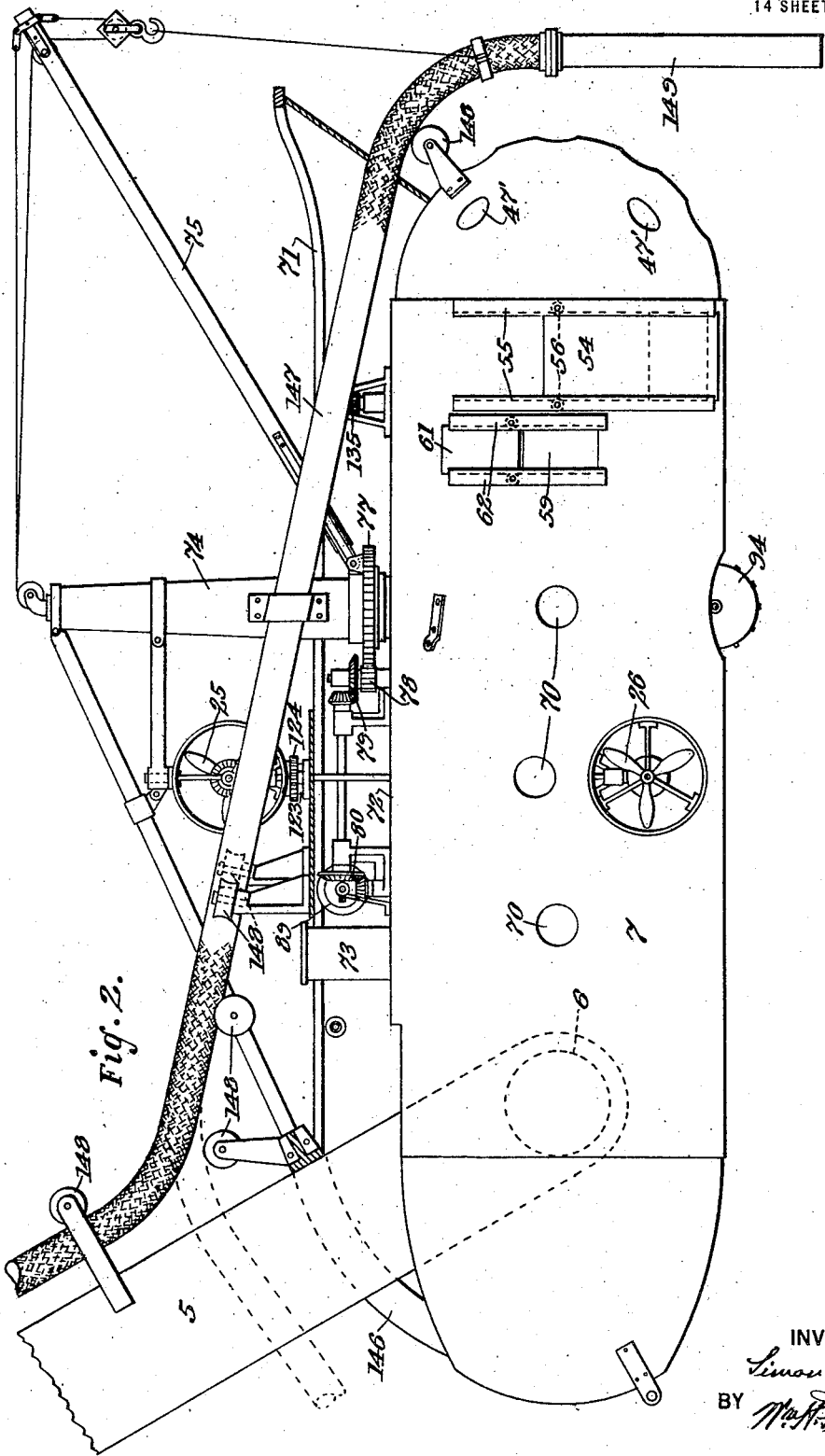
INVENTOR
Simon Lake
BY
ATTORNEY

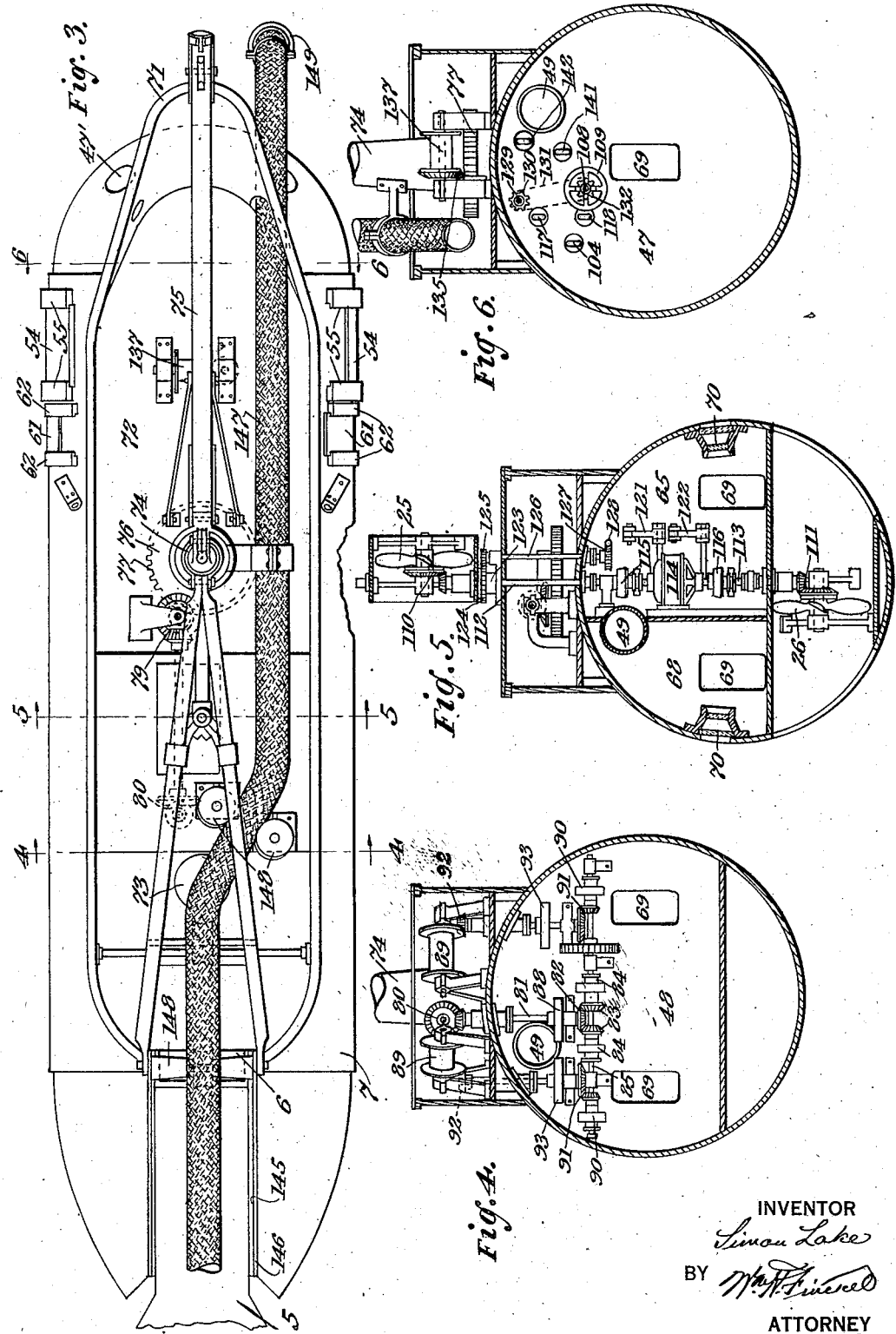

S. LAKE.
SUBMARINE SALVAGING AND EXPLORING APPARATUS.
APPLICATION FILED FEB. 7, 1920.
1,379,928.
Patented May 31, 1921.
14 SHEETS—SHEET 4.
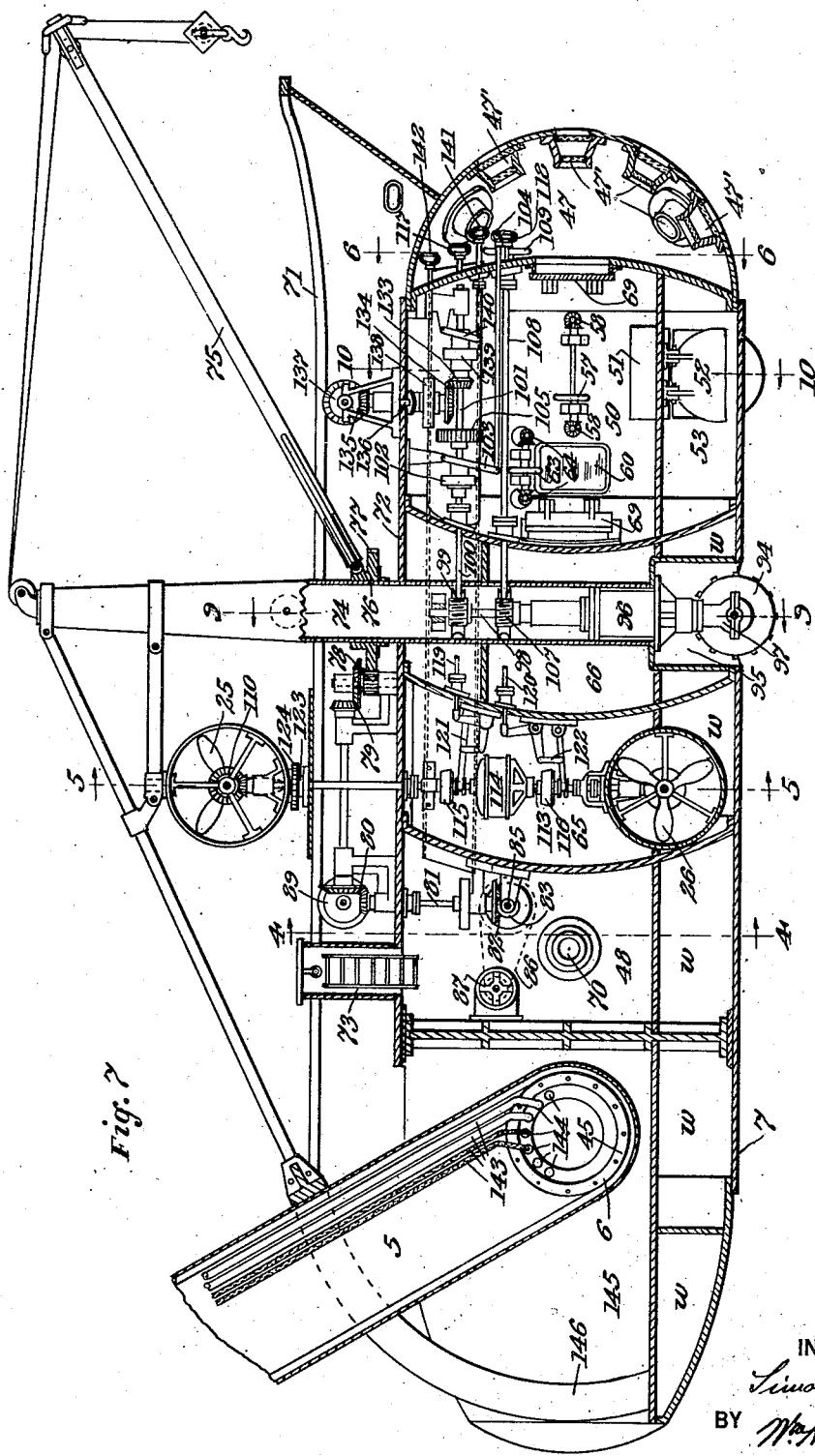
INVENTOR
Simon Lake
BY
ATTORNEY S. LAKE.
SUBMARINE SALVAGING AND EXPLORING APPARATUS.
APPLICATION FILED FEB. 7, 1920.

1,379,928.

Patented May 31, 1921.
14 SHEETS—SHEET

INVENTOR
Simon Lake
BY
ATTORNEY

S. LAKE.
SUBMARINE SALVAGING AND EXPLORING APPARATUS.
APPLICATION FILED FEB. 7, 1920.
1,379,928.
Patented May 31, 1921.
14 SHEETS—SHEET 6.
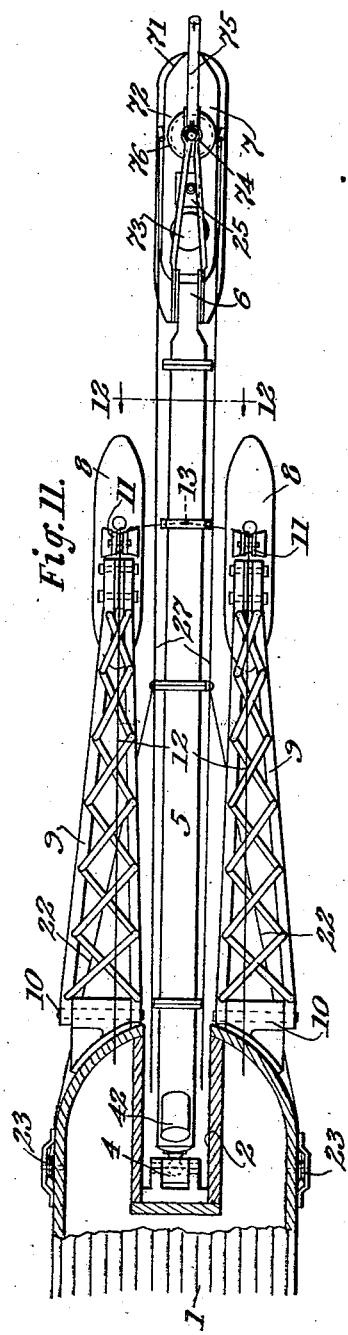
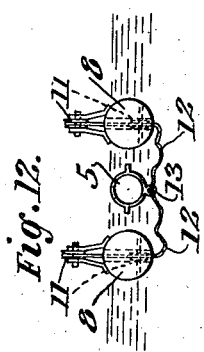
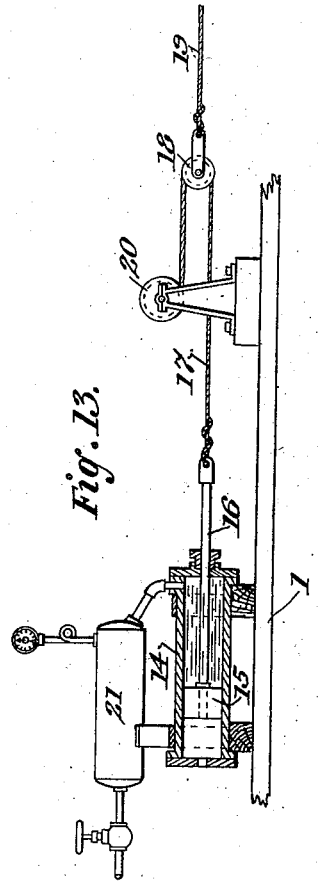
INVENTOR
Simon Lake
BY
ATTORNEY

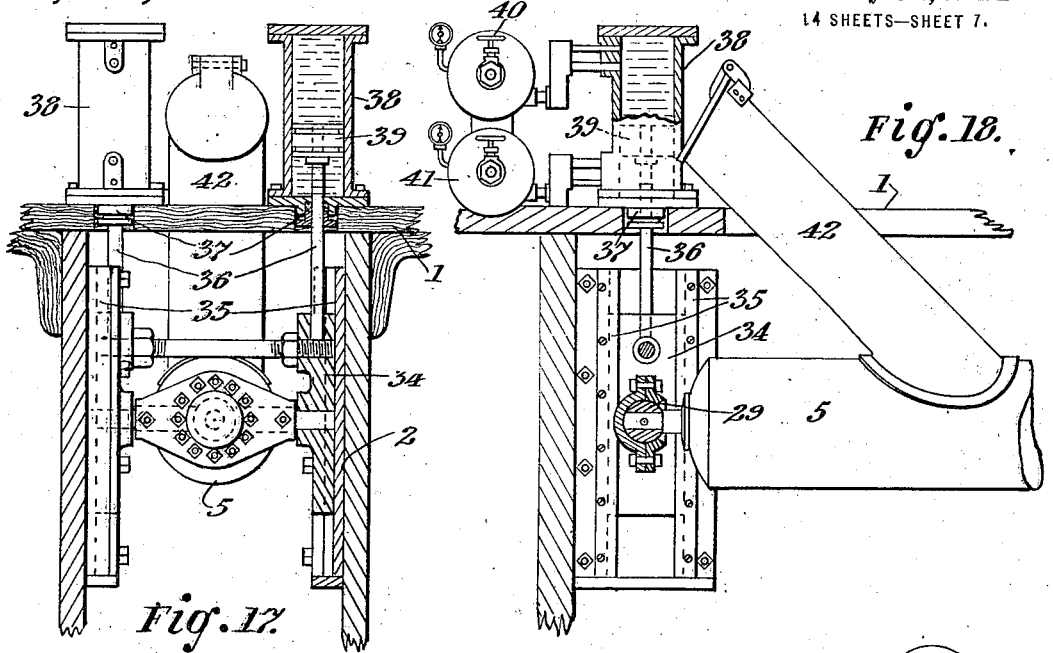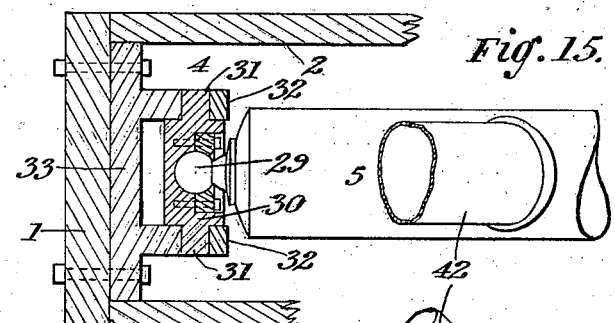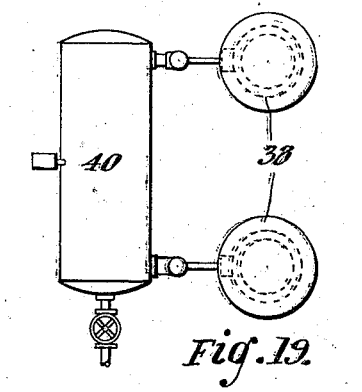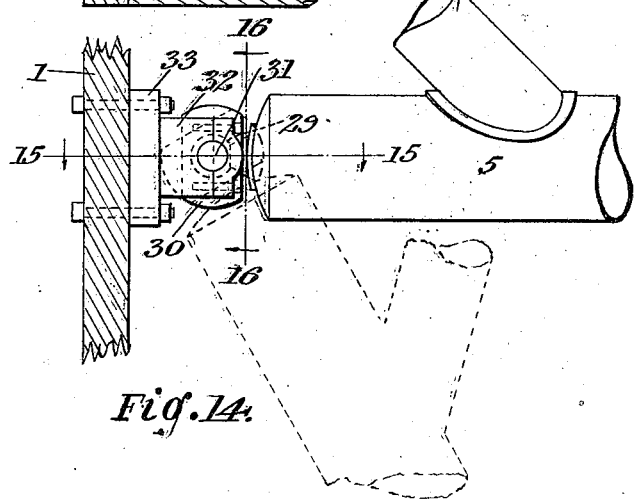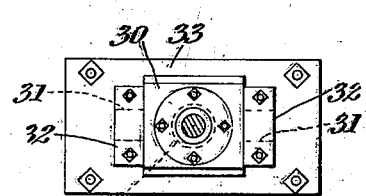

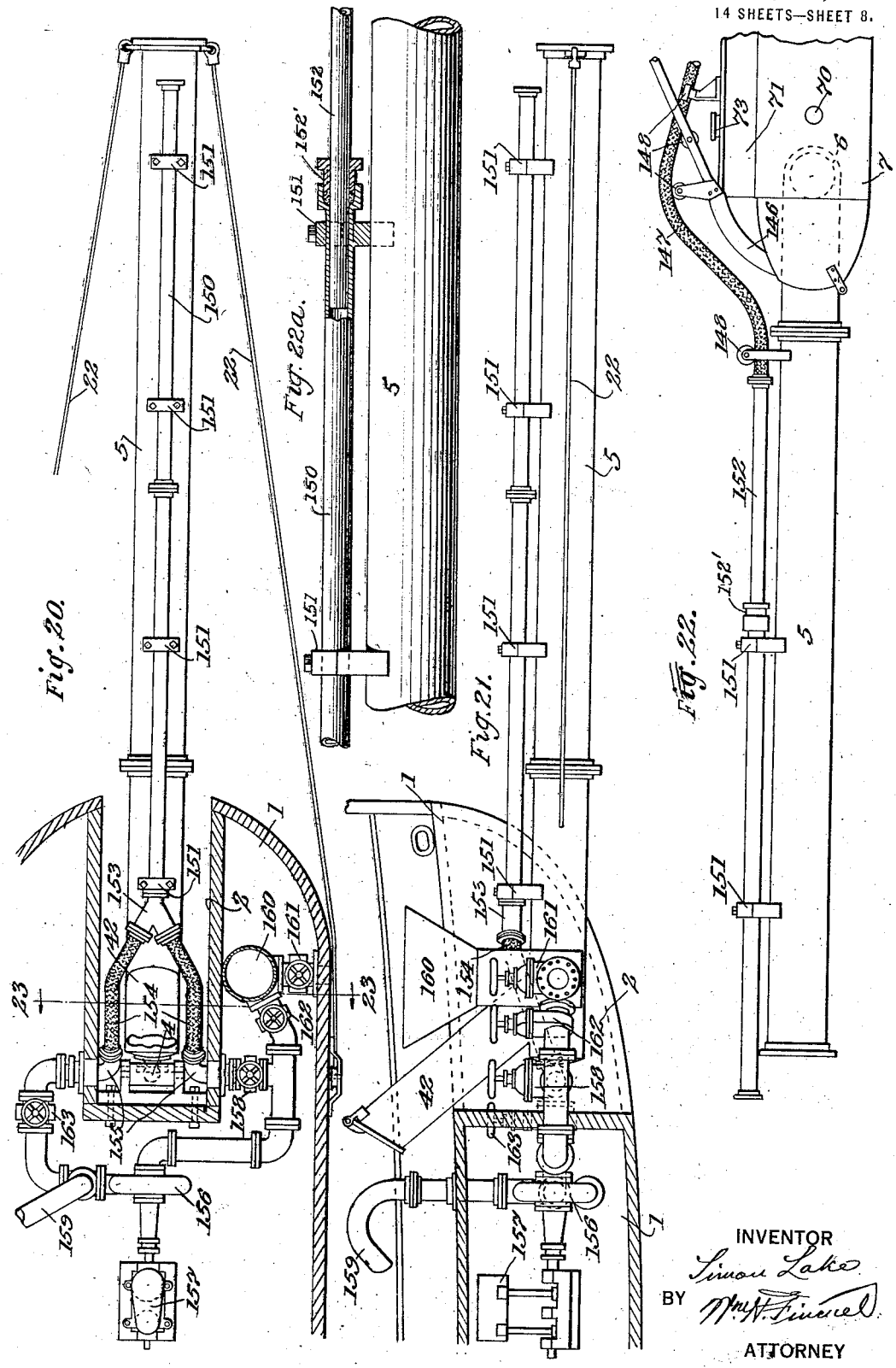

S. LAKE.
SUBMARINE SALVAGING AND EXPLORING APPARATUS.
APPLICATION FILED FEB. 7, 1920.
1,379,928.
Patented May 31, 1921.
14 SHEETS—SHEET 9.
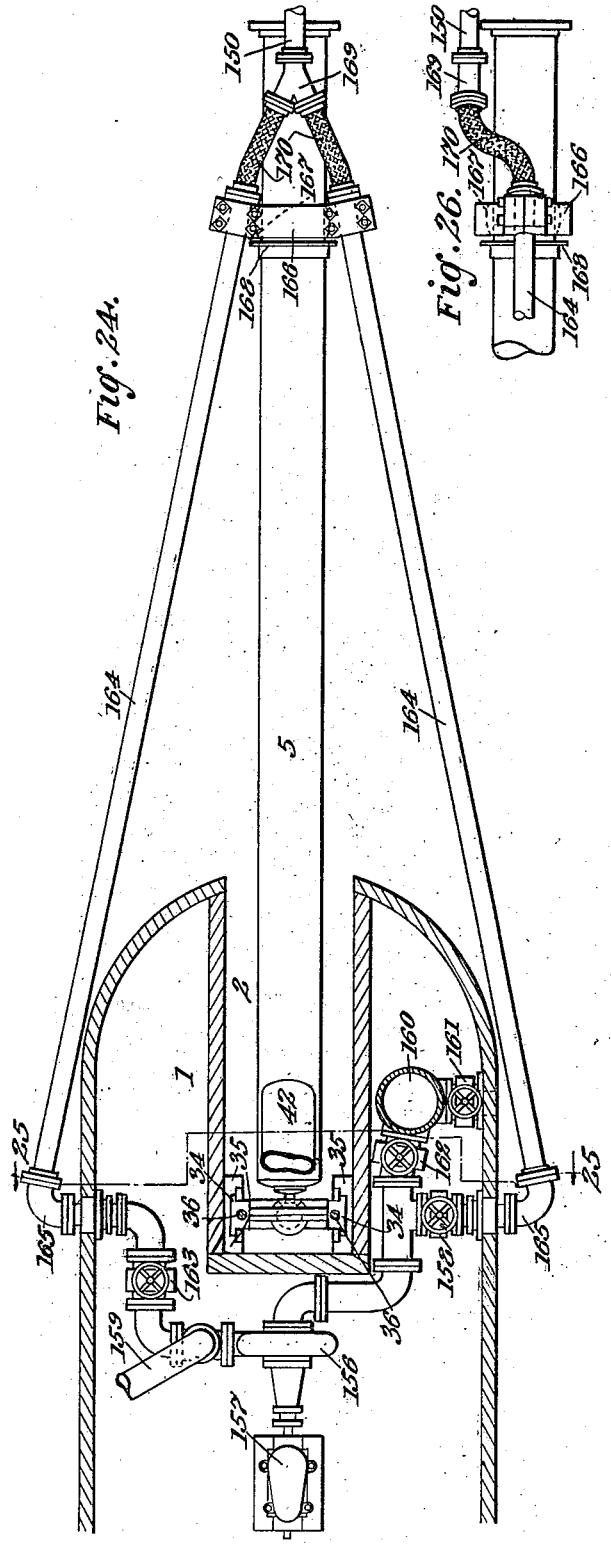
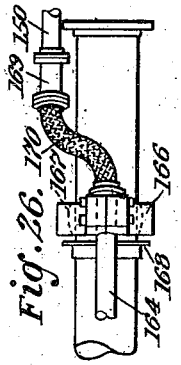
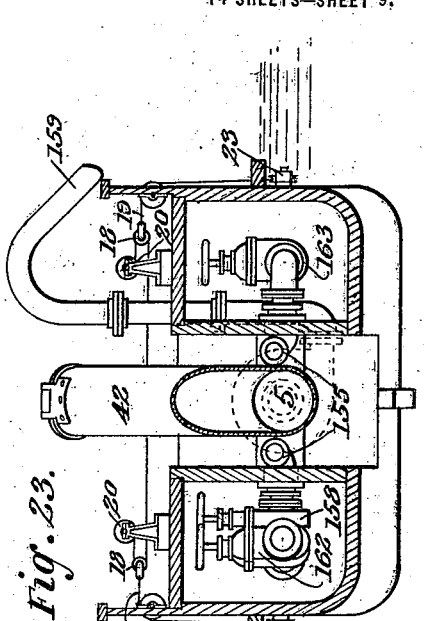
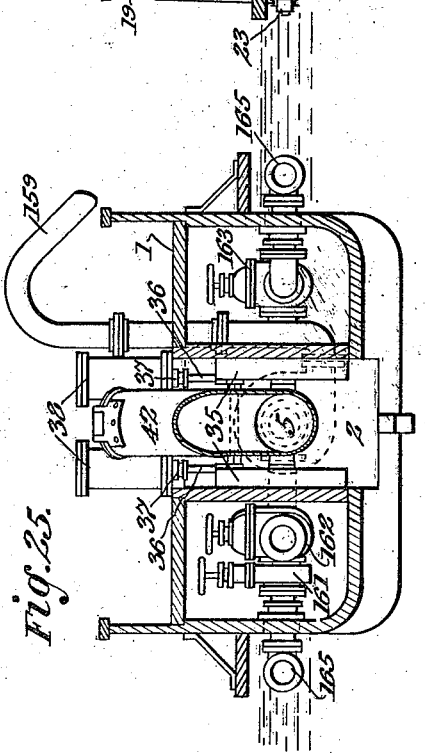
INVENTOR
Simon Lake
BY
ATTORNEY

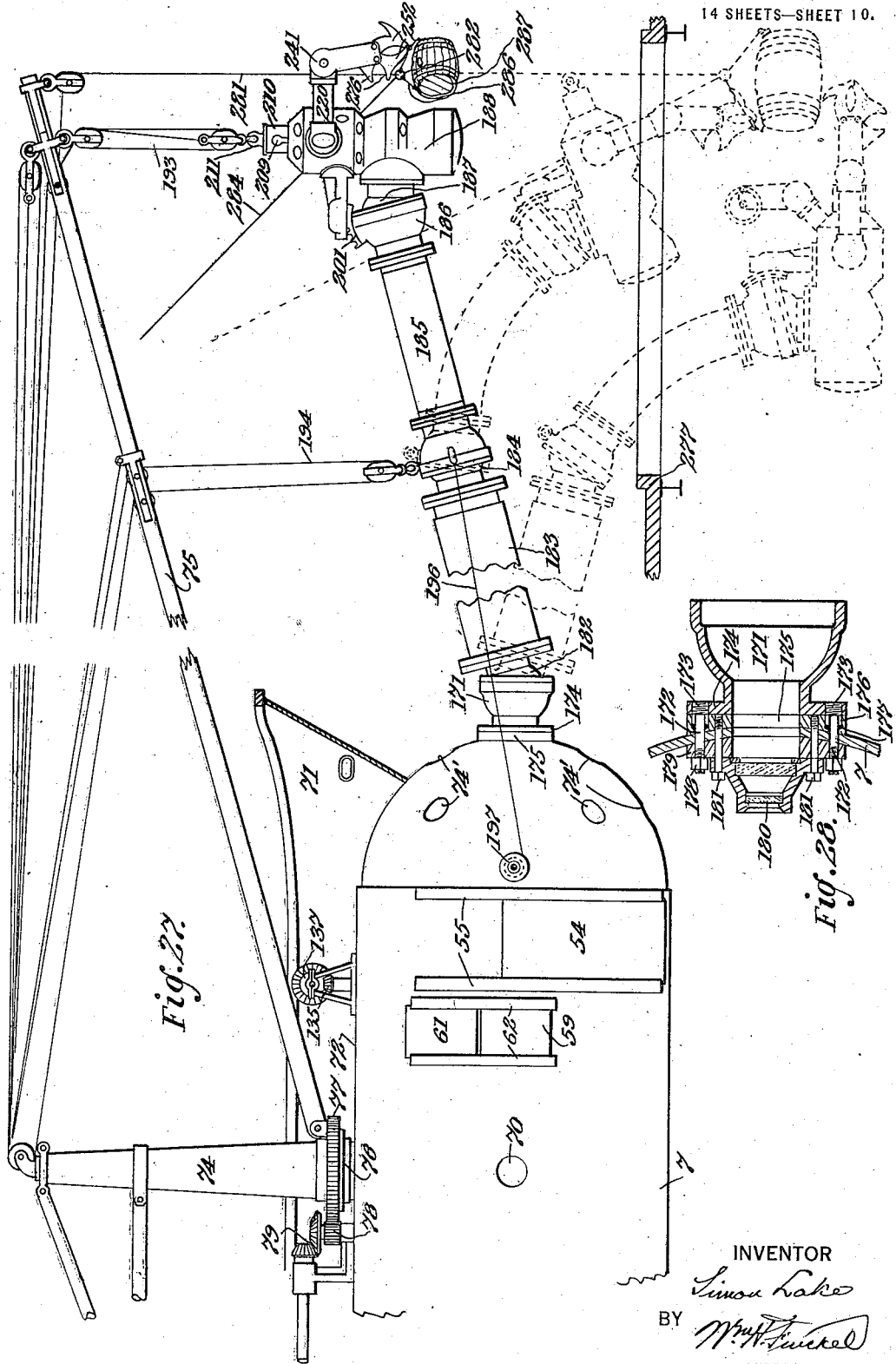

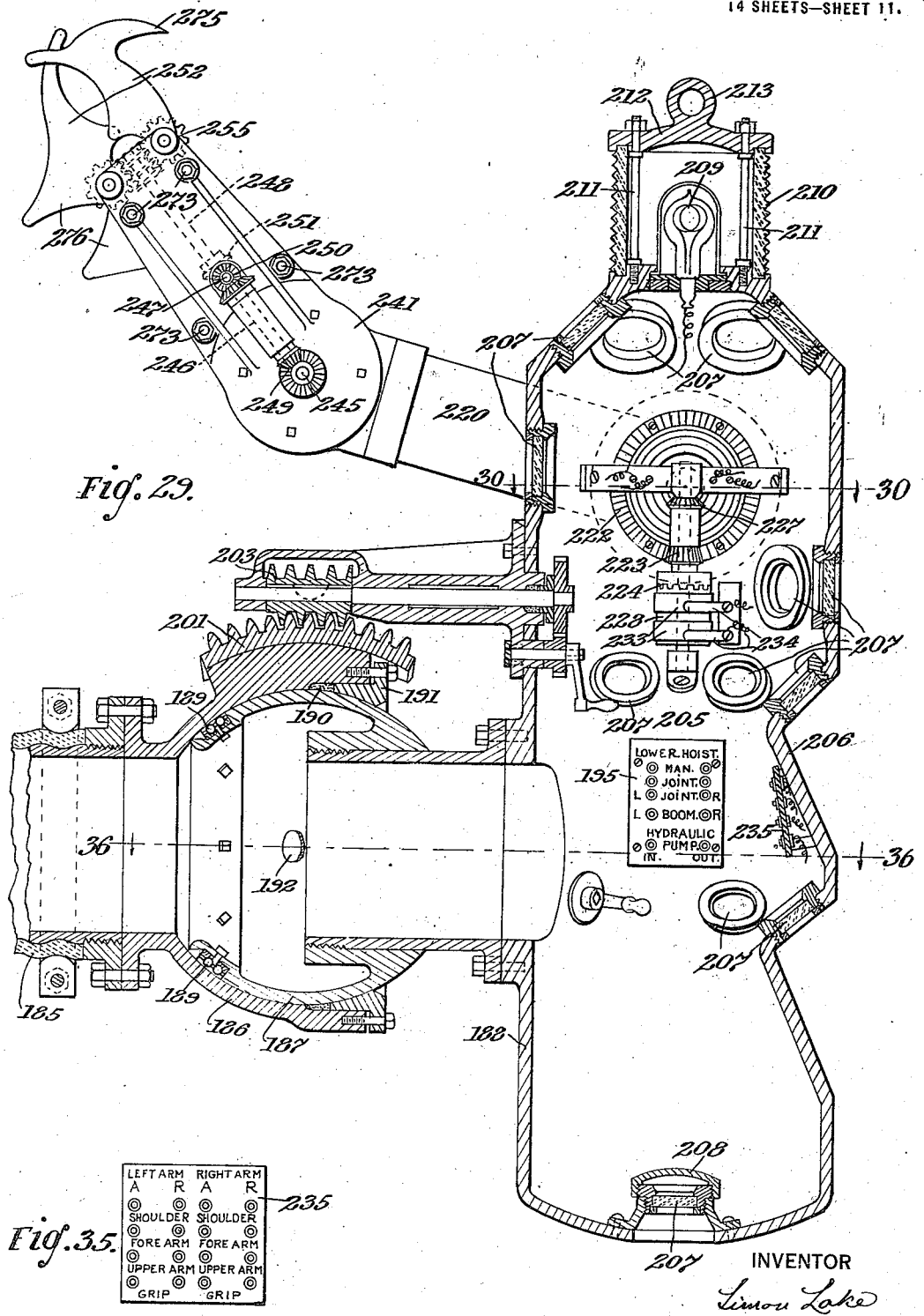

S. LAKE.
SUBMARINE SALVAGING AND EXPLORING APPARATUS.
APPLICATION FILED FEB. 7, 1920.
1,379,928.
Patented May 31, 1921.
14 SHEETS—SHEET 12.
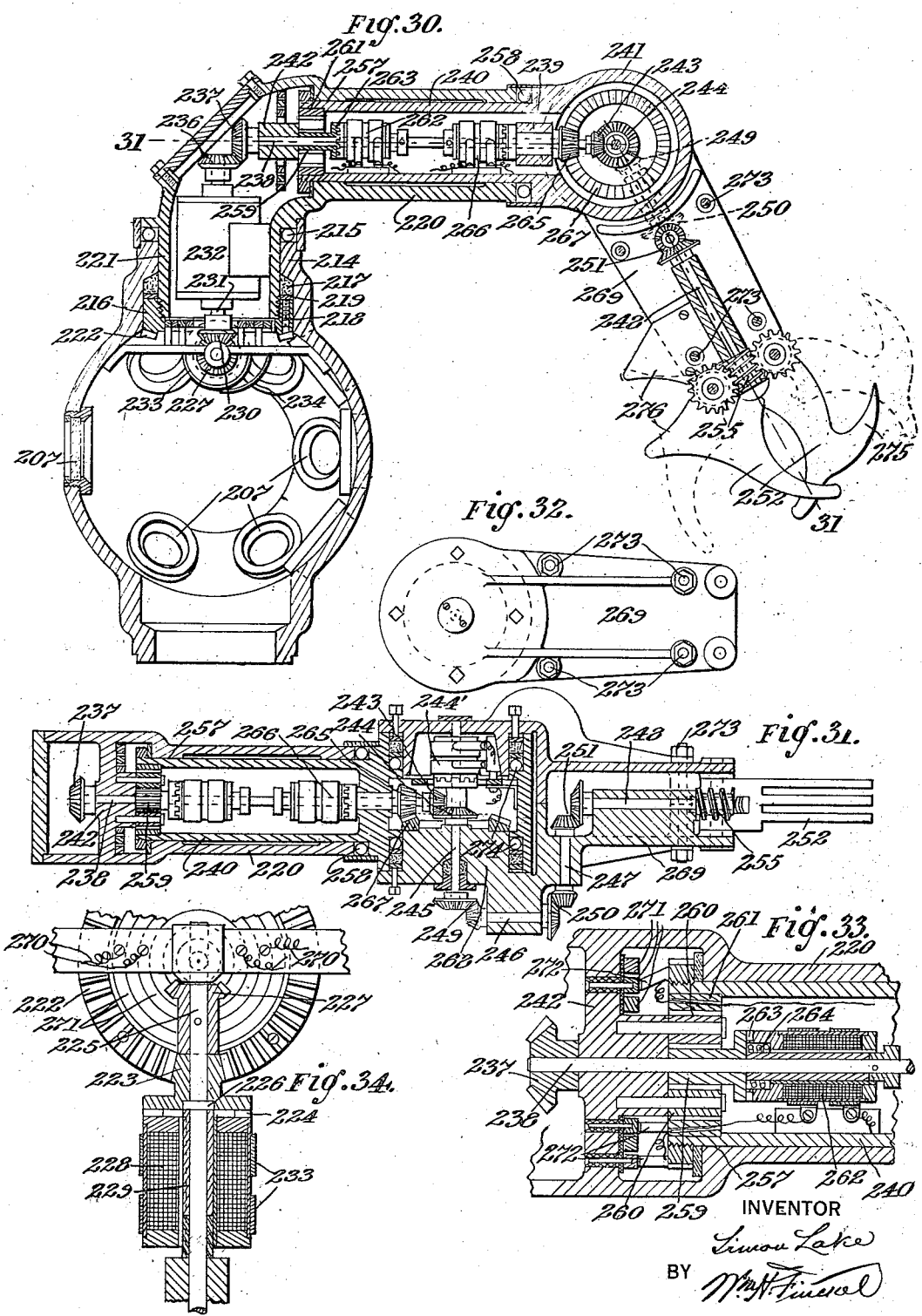

S. LAKE.
SUBMARINE SALVAGING AND EXPLORING APPARATUS.
APPLICATION FILED FEB. 7, 1920.
1,379,928. Patented May 31, 1921.
14 SHEETS—SHEET 13.
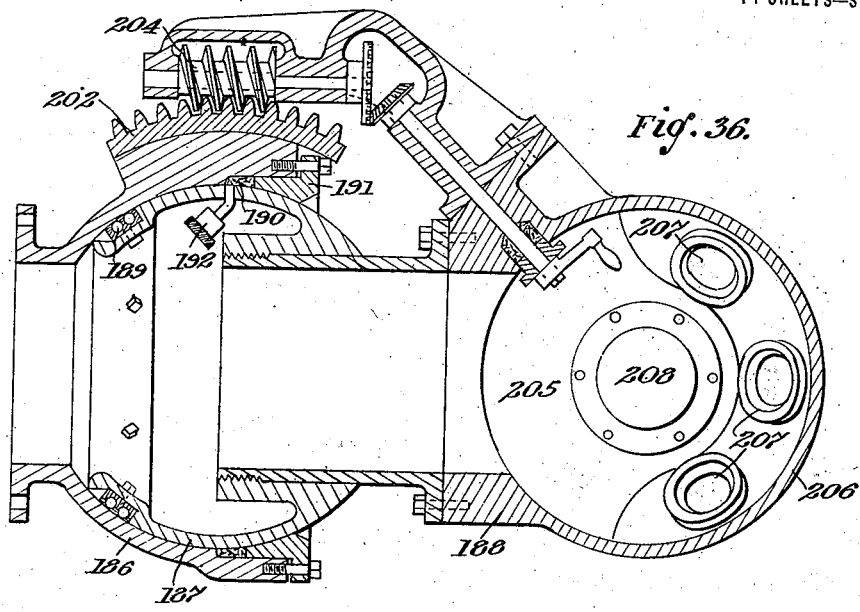
Fig. 36.
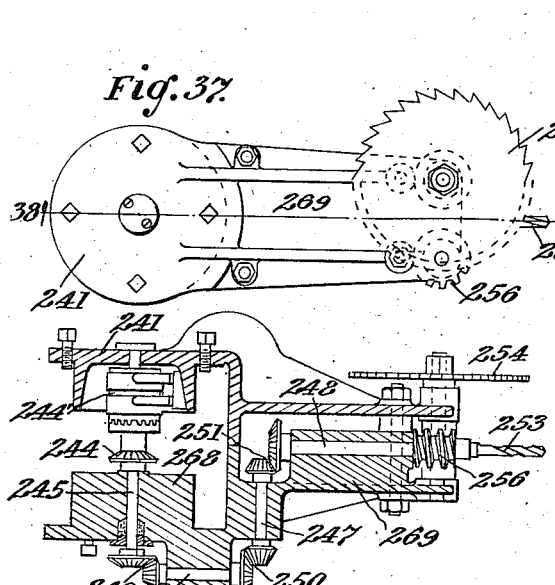
Fig. 37.
Fig. 38.
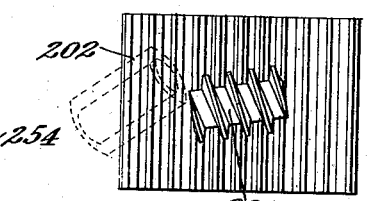
Fig. 39.
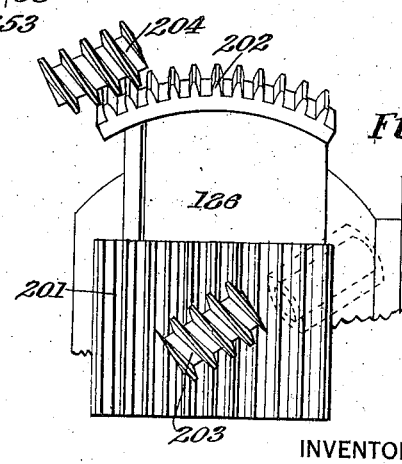
Fig. 40.
INVENTOR
Simon Lake
BY
ATTORNEY S. LAKE.
SUBMARINE SALVAGING AND EXPLORING APPARATUS.
APPLICATION FILED FEB. 7, 1920.
1,379,928.
Patented May 31, 1921.
14 SHEETS—SHEET 14.
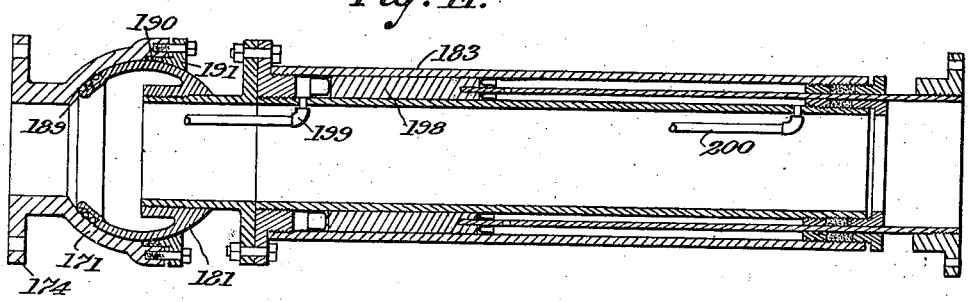
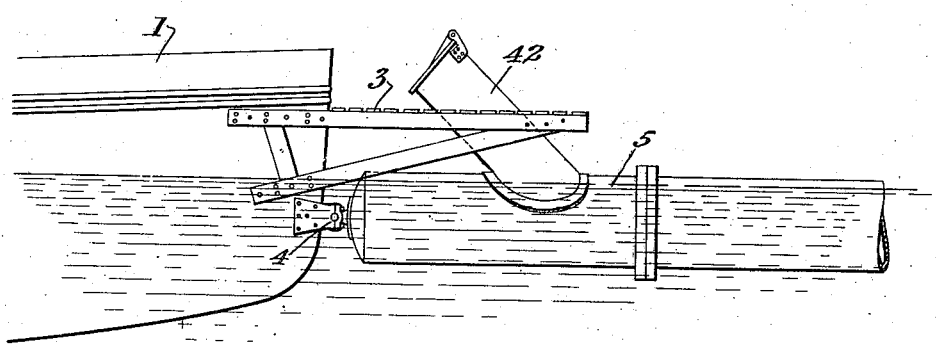
INVENTOR
*Simon Lake*
BY
ATTORNEY

UNITED STATES PATENT OFFICE.

SIMON LAKE, OF MILFORD, CONNECTICUT.

SUBMARINE SALVAGING AND EXPLORING APPARATUS.

1,379,928.   Specification of Letters Patent.   Patented May 31, 1921.

Application filed February 7, 1920. Serial No. 356,947.

*To all whom it may concern:*

Be it known that I, SIMON LAKE, a citizen of the United States, residing at Milford, in the county of New Haven and State of Connecticut, have invented a certain new and useful Improvement in Submarine Salvaging and Exploring Apparatus, of which the following is a full, clear, and exact description.

In submarine salvage operations, as heretofore generally conducted, it has been the practice to send divers down from the surface to perform the salvaging work. This practice is attended by numerous disadvantages, some of which are: the danger to the diver; the short period of time during which the diver may remain submerged at work; the limits of depth of water in which a diver is able to operate efficiently, and the time consumed in raising the diver to the surface when he has been down any considerable depth, owing to the necessity of raising him by stages so that he may be subject to that decompression which is necessary to prevent caisson disease.

It is well known that various devices, such as pressure resisting suits of metal or mostly metal diving armor adapted to maintain within them approximately ordinary atmospheric pressure have been devised and tried out, also that diving-bells have been used, by means of which the divers operate, either from the interior of the bell, or by leaving the bell in diving suits. But these devices are not as efficient as is desirable, and do not meet the requirements of present-day operations. The suits of diving armor are generally constructed with metal joints which, when the armor is worn at depths appreciably lower than those attained in the ordinary diving suits, are so acted upon by the water pressure as to become rigid, thereby making the diver incapable of moving his limbs, and hence rendering him unable to work. Diving bells are not practical for use in sea-ways for the reason that owing to the constant relative movement of the ship, the cables or chains which connect the bell with the ship would be parted by the quick strains to which they would necessarily be subjected. Moreover, in the use of diving bells the decompression of the operatives who descend in them is necessary, and to accomplish this the bell must be raised to the surface.

One of the objects of this invention is to facilitate the salvaging of sunken cargoes and the like, without the necessity of the operatives returning to the surface except when their working period is completed, hence greatly facilitating their work and admitting of work being continuously performed by shifts of men, the apparatus always remaining in working position as long as desired.

Another object, with the above in view, is to provide for the necessary decompression of operatives.

Another object is to provide a salvaging device which permits working on the sea-floor or adjacent thereto, or suspended at any desired distance above an object, such as a sunken ship, but which is constantly in communication with a vessel on the surface thus providing for the passage of operatives between it and the vessel.

Another object is to provide a device for use in connection with the submersible element or submarine of the invention whereby the holds of vessels may be explored with or without the employment of divers who must leave the submarine.

Another object is to provide means whereby cables and guys which are connected to both the surface vessel and the submarine are cushioned so as to prevent breakage.

Another object is to provide, in effect, a captive submarine capable of operating adjacent a submerged wreck or the like, and provided with means coöperating with a surface vessel whereby the sunken cargo of the wreck may be raised to the surface.

Various other objects and advantages will become apparent as the description proceeds.

The invention consists broadly in a device for performing various types of submarine salvaging, and is embodied in a vessel adapted for travel on the surface of a body of water and provided with a submersible element or submarine so connected with it as to be capable of being lowered to the water-bed, this element having a passageway in open communication with the ship whereby operatives, such, for example, as divers, may pass between it and the ship, and also provided with means whereby inspection of the water-bed may be accomplished and through which divers may be sent out, the chamber in which these means are located being subject to air-pressure and connected by a series of compression and decompression chambers with that part of the element which is in direct communication with the ship, so that divers and other operatives may be put under proper compression before leaving the chamber and may also be properly decompressed by stages after returning thereto and before returning to the surface, thus making possible the employment of shifts of men without the necessity of their returning to the surface between diving operations; and the invention also consists in other elements and devices associated and coöperating with those described, including coöperating derricks on the surface vessel and submarine whereby sunken cargoes may be handled, means for raising sunken vessels, and a mechanical salvaging device, all as I will proceed now to explain and finally claim.

Figure 10:
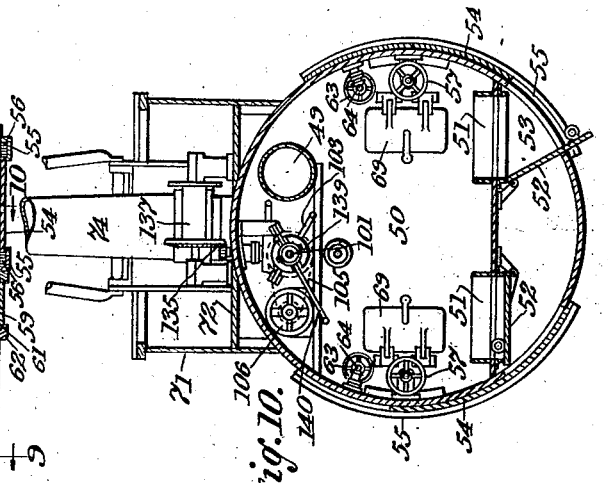
Figure 9:
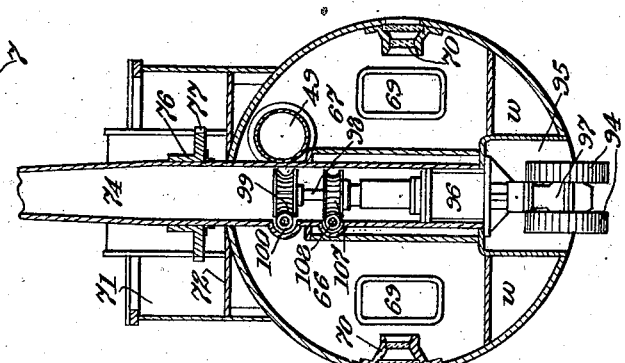

In the accompanying drawings illustrating the invention, in the several figures of which like parts are similarly designated, Figure 1 is a general view of the complete apparatus, and showing in dotted lines the submarine or submersible portion thereof in submerged position and in operative relation to a sunken ship. Fig. 2 is a side elevation of the submarine with attached mechanism. Fig. 3 is a plan view of same. Figs. 4, 5 and 6 are sections taken respectively on the lines 4—4, 5—5 and 6—6 of Figs. 3 and 7. Fig. 7 is a central longitudinal vertical section of the submarine. Fig. 8 is a central longitudinal transverse section of same. Figs. 9 and 10 are sections taken respectively on the lines 9—9 and 10—10 of Figs. 7 and 8. Fig. 11 is a plan view of the forward portion of the surface vessel and showing the submarine and pontoons. Fig. 12 is a section taken on the line 12—12 of Fig. 11. Fig. 13 shows the automatic cushioning means for the guy lines and cables connected with the submarine. Fig. 14 is a side elevation of one form of joint for connecting the tube with the surface vessel. Fig. 15 is a sectional elevation thereof, the section being taken on the line 15—15 of Fig. 14. Fig. 16 is a section taken on line 16—16 of Fig. 14. Figs. 17 and 18 are, respectively, partial sectional end and side views of a modified form of means for connecting the tube with the surface vessel. Fig. 19 is a plan view of the cushioning cylinders and equalizing means used in connection with the means shown in Figs. 17 and 18. Fig. 20 is a sectional plan view showing the pumping connections used for salvaging and dredging purposes. Fig. 21 is a sectional elevation of the mechanism shown in Fig. 20. Fig. 22 is a continuation of Fig. 21 showing the telescoping connection between the suction pipe and flexible tube of the pumping apparatus carried by the submarine. Fig. 22ª is a detail section of the telescoping connection. Fig. 23 is a section taken on line 23—23 of Fig. 20. Fig. 24 shows a modified form of connections for the pumping apparatus. Fig. 25 is a section on line 25—25 of Fig. 24. Fig. 26 is a fragmentary side view of the sliding connection of the suction pipes with the tube. Fig. 27 is a partial sectional side elevation of the bow of the submarine showing the mechanical salvaging apparatus and its operating connections; the dotted lines showing the apparatus in two working positions relative to the hold of a sunken ship. Fig. 28 is a sectional view of the connection of the salvaging apparatus with the submarine. Fig. 29 is a central vertical section of the mechanical salvaging device. Fig. 30 is a section through the body and the left-hand arm thereof, taken substantially in the plane of line 30—30 Fig. 29. Fig. 31 is a section on line 31—31 of Fig. 30. Fig. 32 is an elevation of the forearm looking down upon Fig. 31. Fig. 33 is an enlarged fragmentary sectional view of the left-hand end of Fig. 31 and showing the parts thereof more in detail. Fig. 34 is an enlarged sectional view showing the details of one of the clutch mechanisms. Fig. 35 is a view of a control switch-board. Fig. 36 is a section taken on line 36—36 of Fig. 29. Figs. 37 and 38 are respectively a side elevation and a section of the forearm of the right arm of the device, the section being taken on line 38—38 of Fig. 37. Figs. 39 and 40 are diagrammatic views showing the gearing for imparting motion to the working chamber of the device relative to its supporting tube. Fig. 41 is a longitudinal section showing the pressure cylinder for projecting and retracting the tube supporting the working chamber. Fig. 42 shows the apparatus of the invention as applied to vessels having bows of ordinary type.

Referring to Figs. 1, 11 and 15–26, the surface vessel 1 is shown as provided at the bow with a well 2, see particularly Fig. 11, although this well may be omitted if desired, and a vessel with a bow of ordinary construction used, as shown in Figs. 42, in which case a working platform 3 might, and preferably would, be constructed projecting from the bow at each side of the vessel.

Suitably attached in the well or at the bow, depending upon which type of vessel is used, by means of a universal joint 4, later described, is one end of a tube 5, of rigid, strong construction and preferably made in flanged sections, as shown, capable of being bolted together, so that the tube may be lengthened or shortened as the depth at which work is to be done may require.

At the other end of this tube, and connected thereto by means of a swiveling connection 6, is the submarine or submersible vessel or member 7 of the apparatus fitted with the usual water-ballast tanks and exhausting mechanism for same whereby the submarine may be submerged or brought to the surface as required.

In order that the buoyancy of the submarine and the tube may not be impaired, and to facilitate the lowering and raising of same, and also to provide for relative movement between the surface vessel as she rides in a sea-way and the submarine, I provide various cushioning means for the guys and hoisting lines attached to the tube and to the submarine. One such means comprises floats or pontoons 8, shown in Figs. 1 and 11, supported in fixed radial relation to the surface vessel by means of lattice work or other suitable arms 9 pivoted to the vessel as shown at 10, and on the floats or pontoons are pulleys 11 over which run cables 12 attached to the tube as at 13 and extending inboard to the vessel where they are connected with the drums (not shown) of a suitable hoisting engine. Another cushioning device is shown in Fig. 13 and may have attached to it any one of the guy or other lines which run from the surface vessel to the submarine or the tube, and this device comprises a cylinder 14 having a piston 15 to the rod 16 of which is connected a cable 17 which runs around a pulley 18 attached to the guy or other cable 19 and thence to a drum 20 on which it may be wound to take up slack. The outboard side of the piston 15 works against a head of water, oil, air or other suitable cushioning fluid supplied from a tank 21 in which it may be stored under pressure and from which the supply in the cylinder 14 is drawn and into which it is forced when the piston moves. It will thus be seen that any slight relative movement between the part to which the outboard end of the cable 19 is attached and the surface vessel, such as might be caused by waves, will be compensated for by this cushioning device, and any great movement may be compensated for by allowing the cable 17 to run out from the drum 20, and in either case parting of the cable or guy will be avoided.

In order that the tube and submarine may be suitably braced laterally so as to extend from the ship in the desired direction, I provide guys 22 connected with the tube and running through blocks 23 to the cushioning devices just described.

To further assure the proper desired relative position of the surface vessel and submarine, I provide the surface vessel with a propeller 24 at the stern by means of which the stern may be swung back and forth, and the submarine is supplied with propellers 25 and 26 by which a lateral movement may be imparted to it.

It is desirable that the submarine should be always maintained in a horizontal position, or upon an even keel, and to this end I provide guys 27 and 28 arranged parallel to each other and to the axis of the tube 5 whereby a parallel motion is obtained and the submarine held always as desired.

Referring now to Figs. 14 to 19, I show two forms of device for attaching the tube 5 to the surface vessel 1. Figs. 14 to 16 show the simpler form in which the end of the tube is provided with a ball 29 mounted in a socket 30 having trunnions 31 journaled in brackets 32 mounted upon a plate 33 which is attached to the vessel. By this means I provide a universal joint which will through its trunnion bearings allow the tube to be raised and lowered pivoting on them; the ball and socket joint making possible relative movement between the vessel and tube, as for instance, when the vessel rolls in a sea. In Figs. 17 to 19, I show substantially the same kind of ball and socket and trunnion bearing, but instead of attaching the trunnion bearing rigidly to the vessel, I mount the trunnions in cross-heads 34 having suitable bearings and mounted in guides 35. The cross-heads 34 are provided with rods 36 which pass through stuffing boxes 37 into cylinders 38 and are capped by pistons 39 working in both directions against fluid pressure in these cylinders. The upper and lower ends of the cylinders are connected respectively with pressure tanks 40 and 41, and as both cylinders are connected with the same tanks the pressure in both will be the same. It will thus be seen that by these means I am enabled to keep the tube 5 in proper relation to the surface of the water whether the surface vessel is loaded and low in the water or light and high, the difference being adjusted by the cylinders and the cross-heads.

The tube 5 is provided with a Y branch 42 at its inboard end through which access may be had to its interior from the surface vessel and the interior of the tube may be provided with cleats and railings (not shown) by which descent of operatives therein may be facilitated. Electric lights may also be provided in all the parts of the apparatus, the current for same being supplied from a suitable source on the vessel 1.

Descending the tube 5 the operatives enter the submarine through a passage 43, see Fig. 8, in one of the trunnions 44 of the swiveling connection 6, these trunnions being provided with suitable packing glands 45 and packing 46 to exclude water.

The submarine is divided into a number of compartments (see Figs. 7–10) by means of substantial longitudinal and transverse bulkheads. At the extreme bow of the submarine is the observation and control compartment 47 from which the observer may see in all forward directions by means of windows 47', and from which he may control the mechanical devices of the submarine by apparatus later described. Moreover, he can communicate with the surface vessel by telephone (not shown). This compartment 47 is in constant direct communication with the rearmost or stern compartment 48 which gives access to tube 5, through a passageway 49 extending between the two but isolated from all other compartments, and it will therefore be understood that these two compartments and the passageway may be always under normal atmospheric pressure if desired.

Immediately aft of the control compartment 47 is the working compartment 50 from which divers may be sent out through openings 51 provided with trap-doors 52 giving access to diving chambers 53 which open to the sea but which are normally closed therefrom by means of gates 54 sliding in guides 55 fixed to the shell of the submarine and inclosing gears 56 meshing with rack-teeth on opposite edges of the gates and adapted to be simultaneously operated by a hand wheel 57 and suitable bevel-gearing or the like 58 actuated thereby. In Fig. 10 the gate 54 and door 52 on the port side of the submarine are shown open and those on the starboard side are shown closed.

This compartment 50 is also provided with large observation windows 59 suitably glazed, and this glass 60 is protected by shutters 61 operating in substantially the same manner as the gates 54 in guides 62 by means of hand wheels 63 and gearing 64.

Aft of the working compartment are compression chambers 65 and 66 and decompression chambers 67 and 68 or air-locks as both of these kinds of chambers may be called, and although I have described them as of certain kinds it is to be understood that any one of them is capable of being used either for putting the operatives under pressure or of decompressing them. All of the chambers are provided with suitable airtight doors 69 through which communication may be established between the various chambers and compartments as required.

The compartments *w* in the bilge of the submarine and which would otherwise be waste space are used as water-ballast compartments for assisting in submerging and raising the submarine in the usual manner.

Suitable deadlights or windows 70 are provided at intervals along the sides of the submarine.

The submarine is provided with a superstructure 71 which incloses the deck 72 and tends to facilitate navigation on the surface and also lessens the danger of destruction and fouling of the various mechanical devices mounted upon the deck.

Access is had to this inclosed deck from compartment 48 by means of a companionway 73 having a suitable water-tight hatch, as shown.

A tubular derrick mast 74 is mounted in the submarine and is provided with a boom 75 carried by a rotatable collar 76 having on its periphery a gear 77 which meshes with a pinion 78 driven through bevel-gearing 79—80. This latter gearing is driven by means of a shaft 81 which extends inside of the compartment 48 and is provided with a bevel-gear 82 which meshes with a pair of pinions 83 which derive power through clutches 84 from a shaft 85 driven by means of suitable gearing, here shown as chain and sprocket gearing 86, from a motor 87. It will thus be seen that the boom 75 may be turned in either direction by clutching to shaft 85 one or the other of the pinions 83. A brake 88 is provided for arresting the boom in the desired position (see Figs. 4 and 7).

Hoisting drums 89 are positioned on the deck adjacent the mast 74, and to these drums the hoisting cables of the derrick are attached. These drums are operated from shaft 85 by means of cluches 90, bevel-gearing 91 and 92 and brakes 93 (Figs. 4 and 7).

Mounted directly below and axially of the mast 74 is a pair of traction wheels 94 supported within a cavity or recess 95 in the hull of the submarine and adapted to be held therein or projected therefrom into operating position or contact with the bottom by means of an air or the like cylinder 96. These wheels are driven by means of gearing (not shown) in the housing 97 through a shaft 98 which derives its motion through a worm and wheel gear 99 from a shaft 100 which may be clutched to shaft 101 by means of a clutch 102 controlled by a lever 103 connected with the handle 104 in compartment 47. Shaft 101 is driven by means of chain and sprocket gearing 105 from motor 106 (see Figs. 7 and 10). The direction of the wheels is accomplished by means of worm gearing 107 operated by a shaft 108 and hand-wheel 109, whereby they may be turned in any direction on the axis of the shaft 98.

The propelling action of wheels 94 to move the submarine laterally is aided by means of the propellers 25 and 26, hereinbefore referred to, and these propellers are driven by means of bevel or other gearing 110 and 111 respectively through shafts 112 and 113 connected with a reversible motor 114 and provided with clutches 115 and 116 operated from the observation compartment 47 by handles 117 and 118 on rods 119 and 120 connected with suitable lever and link clutch-shifting mechanism 121 and 122. The propeller 25 is mounted on a swivel bearing 123 provided with a gear 124 which meshes with a pinion 125 mounted on the end of shaft 126 and this shaft carries at its lower end a worm-wheel 127 operated by a worm 128 on a shaft 129 having at its opposite end a sprocket 130 connected by a chain 131 with a sprocket 132 on shaft 108, whereby when the hand-wheel 109 is operated to turn the wheels 94 the gear 124 and pinion 125 will be simultaneously operated to turn the propeller 25 correspondingly on its swivel (see Figs. 5 and 6).

Mounted on shaft 101 in addition to the device hereinbefore described, is a bevel-pinion 133 which meshes with a gear 134, which, through other bevel-gearing 135 on shaft 136 operates a hoisting drum 137. The shaft 136 is also provided with a brake 138. Pinion 133 is thrown into and out of operation by means of a clutch 139 operatively connected with a shifting mechanism 140 actuated by handle 141 in compartment 47, and the brake 138 is similarly operated by handle 142.

All service lines, such as electric cables, telephone wires, air lines and the like, indicated at 143 in Fig. 7, are conducted from the surface vessel to the submarine through tube 5, as shown, and pass from the tube into the submarine through suitably bushed openings 144 in the pivotal joint between the two, flexible connections being provided to compensate for variations between points as the tube and submarine move relatively.

It will be seen by reference particularly to Figs. 3, 7 and 8, that the tube extends into a well 145 in the stern of the submarine, guides 146 being provided at the sides of this well to provide rigid lateral support for the submarine with respect to the tube.

In some salvaging operations where cargoes such as coal, ore and other similar material of a lumpy or granular nature are to be recovered it is easier to raise these materials to the surface by pumping than in any other way, and for this purpose I provide the submarine with a flexible suction tube 147 guided and supported by rollers 148 and provided at its outboard end with a rigid nozzle 149 adapted to be raised and lowered by means of suitable connections with the derrick (see Figs. 2 and 3). This flexible tube extends over the stern of the submarine and is connected with a suction pipe 150 supported in brackets 151 on the tube 5 and made in sections so that it may be lengthened or shortened as the tube 5 is similarly lengthened or shortened. That part 152 of the pipe 150 to which the flexible tube is directly connected is of smaller diameter than the remainder, as shown, and is adapted to telescope into pipe 150 to compensate for lengthening and shortening of the pipe as the submarine and tube 5 move relatively a suitable land 152' being provided to prevent leakage (see Figs. 22 and 22ª).

Adjacent the surface vessel the pipe 150 is provided with a Y connection 153 (see Figs. 20, 21, 22 and 23) each branch of which is provided with a flexible section of tubing 154 which sections in turn are connected with swiveling elbows 155 mounted in line with the axis of the ball and socket joint 4 of tube 5 to permit of corresponding relative movement therewith. These branches are connected through suitable valves and piping with a suction pump 156 operated by an engine 157.

In some salvage operations the hulls of sunken ships are patched by divers so as to form in them water-tight or substantially water-tight compartments and the water is then pumped out of these compartments and material of low specific gravity pumped in, the buoyancy of this material serving to counteract the negative buoyancy of the sunken ship to raise it. By connecting the pumping apparatus of my invention as shown, I am able to salvage cargoes of coal and the like above mentioned, and also perform salvage operations by raising ships as last described. When it is desired to pump from a wreck, the valve 158 is opened and all other valves are closed. The pump being operated, water, and with it the cargo, such as coal, will be raised through the tube 147, pipe 150, valve 158 and pump 156 and discharged overboard through discharge pipe 159. Of course, where coal or other valuable material is raised, the pipe 159 will discharge onto a screen, which will allow the water to pass through but will arrest the material.

When it is desired to pump material to the sunken vessel, the valve 158 will be closed and all the other valves opened. Material will be constantly dumped into hopper 160 and the suction of the pump will take water in through valve 161 and in passing under the hopper this water will carry along with it the material therein past valve 162; and this material will pass through the pump and be forced through valve 163 and down pipe 150 to the wreck. When this operation is in progress there will in all probability be no discharge through pipe 159 because its discharge end is above the rest of the valves and piping and the pumped fluid will of necessity follow the course of least resistance, but, if desired, to insure against any discharge through it this pipe may be provided with a suitable cut-off valve or a cap, not shown. However, it may be of advantage during this operation to have the discharge pipe 159 open, for the reason that should a stoppage occur in the pipe 150 or the parts connected therewith the pump would not have to work against such an increased head but could discharge over the side through pipe 159.

In Figs. 24, 25 and 26 I have shown a modification of the connections between the Y branch and the pump connections. In this form of the invention I may use either the type of ball joint for the tube 5 shown in Figs. 14, 15 and 16, or that shown in Figs. 17 and 18, but I have here illustrated the form shown in Figs. 17 and 18 as other features of the modification are particularly adapted thereto. In this modification I provide pipes 164 which in addition to their function as suction and discharge pipes also serve as lateral struts or braces for the tube 5, and these pipes communicate with the pump connections through swiveling elbows 165, in this case mounted outboard of the vessel 1 but in line with the axis of the ball and socket joint of the tube 5. The converging ends of these pipes are rigidly clamped in a bracket 166 engaging a split collar 167 having a sliding fit on the tube 5 and backed up by a shoulder 168. This collar has its surface which engages the bracket 166 of ball form so that in addition to a longitudinal movement of the bracket with respect to the tube 5 a swiveling movement is also provided for. The ends of the pipes 164 are connected with a Y 169 on the end of pipe 150 by means of flexible tubes 170.

By this arrangement it will be seen that the pivoted end of the tube 5 is free to move up and down as governed by the cushioning cylinders 38 hereinbefore described, the differences in position being compensated for by the sliding collar 167 and the bracket 166 coöperating with it. A large vertical movement of the tube 5 is possible with this arrangement, but a slight lateral movement will be checked by the bracket 166 coming in contact with shoulder 168.

It will be obvious that this pumping equipment, in addition to its usefulness in salvaging operations, is equally applicable to dredging operations, in which case the ability to exactly position it for work and at the same time inspect such work as it progresses by means of the windows in the submarine will be of distinct advantage.

When salvage operations are carried on under conditions which make the use of divers equipped with ordinary diving suits impracticable, such as greater depths and stronger currents than could be risked by a diver so equipped, it is obvious that it would be of advantage to have some mechanical device capable of working efficiently under such conditions, which could in a measure be substituted for a diver. To this end I have devised the apparatus illustrated in Figs. 27 to 41 inclusive, which comprises what is in effect a mechanical man, capable of carrying within it an operator who can, through the medium of devices hereinafter explained, govern its actions.

This device is arranged for use with the submarine 7 as follows:—The deadlight in the extreme bow is removed and the socket 171 is attached by means of bolts 172 having enlarged ends 173 which thread into a flange 174 on the socket 171. Back of this flange is a plate 175 provided with recesses 176 having packings 177 at their bottoms through which the bolts 172 pass with a tight fit. The inner ends of the bolts are provided with nuts 178 seating against a plate 179 whereby the socket and other parts just described are held rigidly in water-tight engagement with the submarine. This particular mode of attaching the socket 171 is advantageous when the mechanical man becomes entangled in wreckage or is otherwise disabled, for the purpose of casting it off from the submarine after the operator has come in. This is done by attaching the deadlight window 180 by means of the bolts 181, as shown in Fig. 28. Then the nuts 178 will be removed and the bolts 172 unscrewed from the flange 174. This will allow the socket to fall away from the submarine and the water pressure acting upon the enlarged ends 173 of the bolts will force them into the recesses 176 against the packings 177 thereby preventing entrance of water around and past the bolts 172.

Into the socket 171 is fitted a ball member 182 connected with the end of one member of a telescoping pressure-operated cylinder 183, shown in enlarged section in Fig. 41, the end of the other member of which is provided with a similar ball member 184 which fits in a socket carried at one end of a flexible tube 185 preferably made of commercial armored fabric tubing. This tube 185 is provided at its other end with a socket 186 in which fits the ball member 187 to which the mechanical salvaging device or mechanical man 188 is directly and rigidly connected. All of these ball and socket joints and tubes are of such diameter and construction as to afford a passageway between the submarine 7 and the device 188 which will allow a man to pass between the two.

The ball and socket joints are all provided with ball-bearings 189 to prevent binding of the joints and consequent rigidity under water pressure, and packings 190 and glands 191, the packings being suitably lubricated by means of suitable grease cups 192, all as shown in Figs. 29, 36 and 41.

The device 188 and the passageway connecting it with the submarine are supported for movement in all directions by means of tackles 193 and 194 connected with and operated by the derrick, the operation of same being under the control of the man stationed in the salvaging device 188 by means of the switch-board 195, Fig. 29. In addition to these supporting means the device may be shifted laterally by means of cables 196 attached to opposite sides of the joint of ball member 184 and running to drums 197 operated from within the submarine by suitable power mechanism (not shown) controlled from switch-board 195. The telescoping cylinder 183 provides for projecting the device from the submarine and for retracting it by means of pressure introduced at either one or the other side of piston-member 198, Fig. 41, through pipes 199 and 200, the valves controlling the admission of fluid under pressure to same being also operated from the switch-board 195, by the buttons marked "Hydraulic pump." By these means the device may be caused to assume a great number of positions in a great many directions, three of which are shown by the full and dotted line positions of Fig. 27.

Referring to Figs. 29, 36, 39 and 40, the socket member 186 is provided with two similar worm-wheel segments 201 and 202 rigidly attached thereto, their centers being ninety degrees apart; that is, one is on the top and the other on one side, and these segments mesh with worms 203 and 204 respectively operated by suitable cranks and gearing from within the working chamber 205 of the device 188. Referring particularly to Figs. 39 and 40, it will be seen that the teeth of the pairs of worms and segments are cut to such a pitch as to permit of a limited relative movement between them, so that when one pair is operated to turn the device 188 in one direction, the other will not be so rigid laterally as to prevent this movement. The range of movement of the worms and segments with respect to each other is illustrated in these figures.

It will thus be seen that by the combined operation of the tackles 193 and 194, the cables 196, the pressure-operated cylinder 183 and the worm and segment gearing just described, the salvaging device 188 is capable of universal movement within the limits set by the construction of the various jointed members.

Referring to Fig. 29, the mechanical salvaging device 188 comprises a casing 206 of such construction as to be capable of withstanding the pressure of the water at the maximum depth at which the device is designed to operate, and this casing forms the working chamber 205 hereinbefore referred to. The casing is provided at various points convenient to the operator with deadlight windows 207, the one in the bottom being fitted with a protecting cover 208. The top of the casing carries a lamp 209 of the usual marine type, inclosed and protected by a holophane or other light-diffusing type of casing 210, held by stud-bolts 211 between the top of casing 206 and a cap 212 which latter is provided with a ring 213 to which the tackle 193 is attached.

The device is fitted with a pair of arms, only one of which is shown complete. As shown, the arm is provided with a shoulder joint 214 having a suitable ball-bearing 215 and a packing gland 216 and packing 217 to exclude water, this packing being compressed as required by set-screws 218 coöperating with a ring 219. On this joint is supported the upper arm 220 provided with a sleeve 221 which forms its swivel in the joint 214 and to this sleeve is threaded the gland 216 upon the face of which is formed a gear 222 which constantly meshes with a pinion 223 (see Figs. 29 and 34) mounted upon one member of a jaw-clutch 224 rotatably mounted on a shaft 225 but held against longitudinal movement thereon between a shoulder 226 and a gear 227 fixed thereon. The other member of the clutch is carried by an electro-magnet 228 slidably keyed to a core 229 fixed to the shaft 225. Shaft 225 is driven through gear 227 by gear 230 mounted on the shaft 231 of motor 232 which also furnishes power for other devices hereinafter explained. The magnet 228 is provided with brush rings 233 coöperating with brushes 234 by which it may be energized from a suitable source of supply connected with the brushes through the control switch-board 235, shown in elevation in Fig. 35, mounted in the chamber as shown in Fig. 29.

Referring to Figs. 30, 31 and 33, the motor shaft 231 is provided on the end opposite gear 230 with a gear 236 which meshes with a complemental gear 237 on a shaft 238 mounted in a bearing 239 in the tubular extension 240 of the elbow joint member 241 and in a bearing 242 in the upper arm. This shaft has mounted at its opposite end a gear 243 meshing with a gear 244 operated by clutch magnet 244' which through suitable shafts 245, 246, 247 and 248 and gearing 249, 250 and 251 transmits power to the grip members 252 of one arm and the tools such as a drill 253 and circular saw 254 of the other arm (Fig. 38) through worm gearing 255 and 256 on these arms, respectively.

In order to turn the elbow joint 241 in its bearings 257 and 258 in the upper arm, I provide a pinion 259 which meshes with idlers 260 meshing in turn with an internal gear 261 (see Figs. 31 and 33) fixed to the extension 240 and this pinion 259 is adapted to be clutched to the shaft 238 by means of an electro-magnet 262 operating in much the same manner as the magnet 228, except that release of the clutch members 263 is effected by a spring 264 (Fig. 33) instead of by gravity as in the former magnet. Flexing of the elbow joint 241 is effected by means of a pinion 265 adapted to be clutched to shaft 238 by magnet-operated clutch 266 and meshing with a ring-gear 267 fixed to the elbow end 268 of the forearm 269.

Current is transmitted for operating the various electro-magnet clutch devices through suitably insulated wires 270, brush-rings 271 and brushes 272 carried in convenient parts of the swiveling joints of the arms as shown (see particularly Fig. 33.)

The forearm 269 is made in halves bolted together as by bolts 273 and thus held in operative relation upon bearings 274 on the elbow joint of the member 241.

The grippers 252 in addition to their provision for grasping objects are provided with a hook 275 and shears 276, as shown in Fig. 30.

All of the electro-magnets operating the clutches are energized by means of the push-button switches of switch-board 235.

Referring to Figs. 1, 7 and 27, in Fig. 1 I show in dotted lines means whereby cargoes may be salvaged in a manner superior to anything now known, as follows:—The submarine 7 is lowered or submerged to a position adjacent the wreck or sunken vessel 277, a diver 278 is sent out through one of the openings 51 and breaks into the hold of the vessel as by means of one of the cargo-loading openings 279. The diver then affixes a pulley 280 to some substantial part of the vessel.

One of the falls 281 of the derrick-boom 75 is provided with a strong ring 282 to which, in addition to the fall 281, are attached a cable 283 which is run over the pulley 280 and thence to the drum 137 on the submarine, and a fall 284 which extends to a derrick 285 mounted on and operated from the surface vessel 1.

In order to salvage the cargo, the diver signals to the operator in the observation compartment of the submarine to haul in on cable 283, thus pulling the ring 282 and the falls attached thereto over to pulley 280. The diver may then grasp the grapple 286 also attached to ring 282, and cable 283 being slacked at his signal, may attach the grapple to an object of the cargo, such as a barrel 287. A signal is then given to the operator on the submarine and he operates the derrick boom 75 to swing it out from the wreck and clear of the submarine, the cable 283 running out with it. When all is clear, the operator on the submarine signals to the surface vessel to hoist away, and on this signal the derrick 285 is operated to raise the object 287 by means of the fall 284, the cable 283 and fall 281 being paid out along with it to the surface. In order to repeat this operation, the drums on the submarine take in the fall 281 and cable 283 and thereby lower the grapple to the pulley 280 again, the fall 284 being paid out.

As shown in Fig. 27, the mechanical salvaging device may be used to perform the same functions as are performed by the diver in such operations, and in this case the pulley 280 may be dispensed with. Moreover, the device may be lowered into holds for the purpose of exploring them and of picking up articles and cutting away obstructions.

It will thus be seen that I do away with the necessity, now common in such operations of the diver going down from the surface in his suit, and, in addition to dragging with him his air-hose and shot-line and communication cables, also manipulating a heavy grapple and the cables attached thereto and running to the surface, thereby greatly facilitating the work of the diver and expediting the salvage operations.

In operations such as that just described where it is necessary to send divers out from the submarine, the compression and decompression chambers of my invention will be decidedly useful. A diver can operate under sustained pressure for only short periods of time, after which, if he has been working at any appreciable depth he will have to be brought by stages back to normal, particularly as regards his respiratory organs, otherwise he will be either killed or seriously injured by internal hemorrhage or other violent disorders, and when this decompressing, as it is called, is necesssary it may be accomplished as the divers leave the working compartment in the decompressing chambers 67 and 68 of the submarine, which are large enough to accommodate several divers at once, one chamber being used for the first stage of decompression and the other for the final stage, whereupon the divers may go into the compartment 48 which is, as stated, always under atmospheric pressure.

Similarly, when divers are to enter the working compartment, which is at the pressure of the outside water, they may become accustomed to such pressure by subjecting themselves to air pressure in the compression chambers 65 and 66 before entering the working compartment.

It will be seen that by this arrangement it will be unnecessary for the divers to go to the surface between shifts of work, but may stay in the submarine and be ready at a moment's notice to go back to work again.

Another feature of this type of salvage apparatus which gives divers operating from it a distinct advantage over those sent down from the surface, is that they are not encumbered with such long air-hose and other lines and are hence able to perform their work much more efficiently.

In actual practice, I have found that by propelling the submersible element ahead of the surface vessel, instead of in effect towing it or supporting it within the hull of that vessel, as was proposed in the apparatus of my Patents Nos. 738,206, dated September 8, 1903 and 760,457, dated May 24, 1904, I not only greatly reduce the drag on the surface vessel but, when rough weather is encountered, considerably stabilize it, the forwardly-projecting submarine and attached tube forming a sort of break-water which effectively reduces the force of the seas before they reach the vessel.

It will of course be understood that all of the compartments which require them are provided with compressed air pipes fitted with suitable valves, and that the working compartment is also provided with air-pipes to which the air-hose of diving helmets may be attached instead of attaching them to the ordinary hand-operated pump common to diving apparatus. Such pipes and the various electric wires and lights and other minor installations have been omitted from the already detailed drawings in the interest of clearness, their installation being within the province of the designer.

Various changes in details of construction and arrangement of parts are contemplated as within the spirit of the invention and the scope of the following claims.

What I claim is:—

1. In apparatus of the kind described, a surface vessel, a submersible vessel, means connecting these vessels, floats pivotally projected from said surface vessel and cables connected with said connecting means and coöperating with said floats whereby said cables are cushioned.

2. In apparatus of the kind described, a surface vessel, a submersible vessel, a rigid tubular structure pivotally connecting these vessels, arms pivoted to said surface vessel and extending forwardly thereof, floats pivoted to said arms and arranged laterally of the plane of vertical pivotal action of said tubular structure, and supporting cables connected with said tubular structure and coöperating with said floats whereby upon relative movement between said surface vessel and submersible vessel said cables may be cushioned.

3. In apparatus of the kind described, a surface vessel, a submersible vessel, means including a tube pivotally connected at its opposite ends to said vessels for pivoting the vessels relatively, and means including guys extending between said vessels and attached fore and aft of the pivot of said tube on the surface vessel and fore and aft of the pivot of the tube on the submersible vessel whereby a parallel motion is effected for the purpose of maintaining said submersible vessel on an even keel.

4. In apparatus of the kind described, a surface vessel, a submersible vessel, a longitudinally rigid structure pivoted to said vessels and adapted to hold them relatively at a fixed radial distance, and guys extending between said vessels and so attached thereto fore and aft of the pivotal points of said structure that the lines drawn between their points of attachment form a parallelogram, whereby during the pivotal movement of said submersible vessel with respect to said surface vessel the former will be held on an even keel relative to the latter.

5. In apparatus of the kind described, a surface vessel, a submersible vessel, a longitudinally rigid structure connecting these vessels, a universal joint between said structure and surface vessel, and guys connected with said surface vessel and with said structure for limiting lateral movement thereof relative to said surface vessel on said universal joint.

6. In apparatus of the kind described, a surface vessel, a submersible vessel, a longitudinally rigid structure connecting these vessels, a universal joint between said structure and surface vessel, guys connected with said surface vessel and with said structure for limiting lateral movement thereof relative to said surface vessel on said universal joint, and cushioning devices connected with said guys to prevent parting of same during such movement.

7. In apparatus of the kind described, the combination with a surface vessel and a submersible vessel and a semi-buoyant structure connecting the two, of a universal joint connecting said structure with the surface vessel and means for adjusting said joint vertically to accommodate the waterline of the semi-buoyant means to the waterline of the surface vessel.

8. In apparatus of the kind described, the combination with a surface vessel and a submersible vessel and a semi-buoyant structure connecting the two, of a joint connecting said structure and surface vessel, automatic means carrying said joint for adjusting the position of said joint vertically to accommodate the waterline of the semi-buoyant means to the water line of the surface vessel.

9. In apparatus of the kind described, the combination with a surface vessel and a submersible vessel and semi-buoyant means connecting the two, of means including fluid-pressure apparatus for adjusting the waterline of the semi-buoyant means with respect to the surface vessel.

10. In apparatus of the kind described, the combination with a surface vessel and a submersible vessel and semi-buoyant means connecting the two, of means including fluid-pressure cushioning means for adjusting the waterline of the semi-buoyant means with respect to the surface vessel.

11. In apparatus of the kind described, a surface vessel and a submersible vessel, a grapple for salvaging cargo, a plurality of lines connected therewith, one of said lines extending to a hoist on the surface vessel, a second of said lines extending to a hoist on the submersible vessel, and a third line extending to a drum on said submersible vessel, the line extending to said surface vessel being adapted to raise said grapple and other lines to the surface, and the other lines adapted to return said grapple and first-mentioned line to the point of operations and to aid in adjustment of said grapple relative thereto, as specified.

12. In apparatus of the kind described, a surface vessel and a submersible vessel, a tubular structure connecting and forming a passageway between them and communicating with the atmosphere, a plurality of longitudinal and transverse partitions forming a compartment at the bow of the submersible vessel and a compartment at its stern, means defining a passageway affording direct communication between these compartments and isolated from the rest of the interior of the vessel, said stern compartment giving access to said tubular structure and affording communication of said bow compartment through said passageway with the atmosphere.

13. In apparatus of the kind described, a surface vessel, a submersible vessel, means connecting these vessels, a tube carried by the submersible vessel, a pump carried by the surface vessel, and valve-controlled connections between said tube and pump whereby by manipulation of said valves said pump may be made to suck through said tube and discharge over the side of the surface vessel or to suck through an inlet adjacent the surface and discharge through said tube, for the purpose specified.

14. In apparatus of the kind described, a surface vessel, a submersible vessel, a longitudinally rigid structure connecting said vessels and jointed to both thereby providing for relative movement between them, a tube carried by the submersible vessel, a pump carried by the surface vessel, a pipe carried by said connecting structure and communicating with said tube and pump, and a telescoping joint in said pipe whereby extension and contraction of said pipe lengthwise may be accommodated as the surface and submersible vessels move relatively.

15. In apparatus of the kind described, a surface vessel, a submersible vessel, connection devices between said vessels including a longitudinally rigid structure pivoted to said surface vessel, a tube carried by said rigid structure, a pumping apparatus carried by said surface vessel, and means connecting said pumping apparatus with said tube, said means including a pipe pivoted in line with the pivots of said rigid structure and acting as a strut for said structure.

16. In apparatus of the kind described, a surface vessel, a submersible vessel, a connection member between said vessels pivoted to said surface vessel, a tube carried by said connection member, a pumping apparatus carried by said surface vessel, and means connecting said pumping apparatus with said tube, said means comprising a pair of pipes pivoted at one end on opposite sides of the surface vessel in line with the pivot of said connection member and their other ends mounted in a bracket on said member and capable of sliding action therein, and said bracket having a rotating action on said member, the pipes acting as lateral struts for the member.

17. In apparatus of the kind described, a surface vessel, a submersible vessel, means affording communication between the same and with the atmosphere, and a mechanical salvaging device adapted to contain an operator and connected with and supported from the submersible vessel and communicating with the atmosphere.

18. In apparatus of the kind described, a submersible vessel, a mechanical salvaging device adapted to contain an operator, means defining a passageway affording communication for said operator between the vessel and device, and means for raising and lowering said device and for moving it laterally and toward and away from said vessel, and means within said device for operating said last mentioned means.

19. In apparatus of the kind described, a submersible vessel, a mechanical salvaging device adapted to contain an operator, and a support for said device, said support furnishing a passageway whereby said operator may pass between the vessel and the device, the support being provided with joints for permitting movement of the device in all directions.

20. In apparatus of the kind described, a submersible vessel, a mechanical salvaging device adapted to contain an operator, a support for said device furnishing a passageway whereby said operator may pass between the vessel and the device, said support being provided with joints for permitting movement of the device in all directions, and a section of said support provided with a telescoping member whereby the support may be lengthened or shortened.

21. In apparatus of the kind described, a submersible vessel, a mechanical salvaging device, a support for said device in open communication with said vessel and attached thereto, the means of attachment between said support and vessel being provided with sealing means whereby the support is capable of removal from the vessel under water without admitting water to said vessel.

22. In apparatus of the kind described, a vessel, a mechanical salvaging device comprising a casing forming a working chamber, a support for said device connected to said vessel and to which the device is connected by a flexible joint, coöperating gearing on said joint and casing; and means operable from within said chamber for actuating said gearing whereby said device may be moved relatively to said support.

23. In apparatus of the kind described, a vessel, a mechanical salvaging device comprising a casing forming a working chamber, a support for said device connected to and supported by said vessel and to which the device is connected by a flexible joint, and coöperating gearing on said joint and casing and means within said chamber for operating said gearing for moving said device relatively to said support in two directions normal to each other.

24. In apparatus of the kind described, a surface vessel, a submersible vessel, a tube connecting these vessels and affording communication therebetween, a mechanical salvaging device, and a tube connecting said device with said submersible vessel, said last mentioned tube affording communication between said submersible vessel and the salvaging device.

25. In apparatus of the kind described, a surface vessel, a submersible vessel, and a mechanical salvaging device, and tubes connecting said surface vessel with said submersible vessel and said submersible vessel with said salvaging device respectively.

26. In apparatus of the kind described, a surface vessel, a submersible vessel, a tube connecting said submersible vessel with said surface vessel and supporting it relative thereto, and a salvaging device connected with said submersible vessel and supported with relation thereto by means of a jointed tube, said tubes affording communication between said surface vessel, submersible vessel and salvaging device, as specified.

27. In apparatus of the kind described, a surface vessel, a submersible vessel, partitions in said submersible vessel forming a forward or control compartment, a stern compartment and a passageway, said passageway connecting these compartments and affording open communication therebetween, a mechanical salvaging device supported by said submersible vessel, and tubes connecting and forming passageways between said surface vessel and submersible vessel and submersible vessel and salvaging device and communicating with said stern and forward compartments respectively, whereby said salvaging device is in open communication with said surface vessel and hence with the atmosphere.

In testimony whereof I have hereunto set my hand this 4th day of February, A. D. 1920.

SIMON LAKE.

Witnesses:
  LUCY B. MCLAUGHLIN,
  R. M. KEYS.